United States Patent [19]

Möbius

[11] Patent Number: 4,732,342
[45] Date of Patent: Mar. 22, 1988

[54] DRIVE ASSEMBLY FOR MICROFILM CARTRIDGES

[75] Inventor: Heinz G. Möbius, Düseldorf, Fed. Rep. of Germany

[73] Assignee: Minnesota Mining and Manufacturing Company, St. Paul, Minn.

[21] Appl. No.: 43,356

[22] Filed: Apr. 28, 1987

[30] Foreign Application Priority Data

May 7, 1986 [DE] Fed. Rep. of Germany ....... 3615495

[51] Int. Cl.$^4$ ..................... B65H 18/08; G03B 21/11; G03B 1/04
[52] U.S. Cl. .................................. 242/68.1; 242/68.3; 242/200
[58] Field of Search .................. 242/46.2, 46.4, 55, 242/179, 197, 200, 201–203, 67.1 R, 67.3 R, 68.1, 68.3, 68.4, 71.8, 72 R; 360/132, 96.3

[56] References Cited

U.S. PATENT DOCUMENTS 2,998,206  8/1961  Pendleton ........................ 242/68.1
3,739,998  6/1973  Esashi et al. ..................... 242/68.3
3,871,755  3/1975  Wright .......................... 242/68.3 X Primary Examiner—David Werner
Attorney, Agent, or Firm—Donald M. Sell; James A. Smith; David W. Anderson

[57] ABSTRACT

A drive assembly for reels of microfilm provided in a cartridge and placed in a cartridge receiving channel in a direction normal to the axis of the reel supporting the coil of microfilm and usuable with cartridges having differently designed reels comprises a main drive shaft which can be coupled direct to the reel with a backup wheel or coupled to a drive head that is connected in driving engagement with the reel. Automatic locking means and spring biased drive parts afford a drive that is adaptable to the cartridge reel. Releasable drive means withdraw the drive shaft and drive head from the cartridge receiving channel.

15 Claims, 6 Drawing Figures

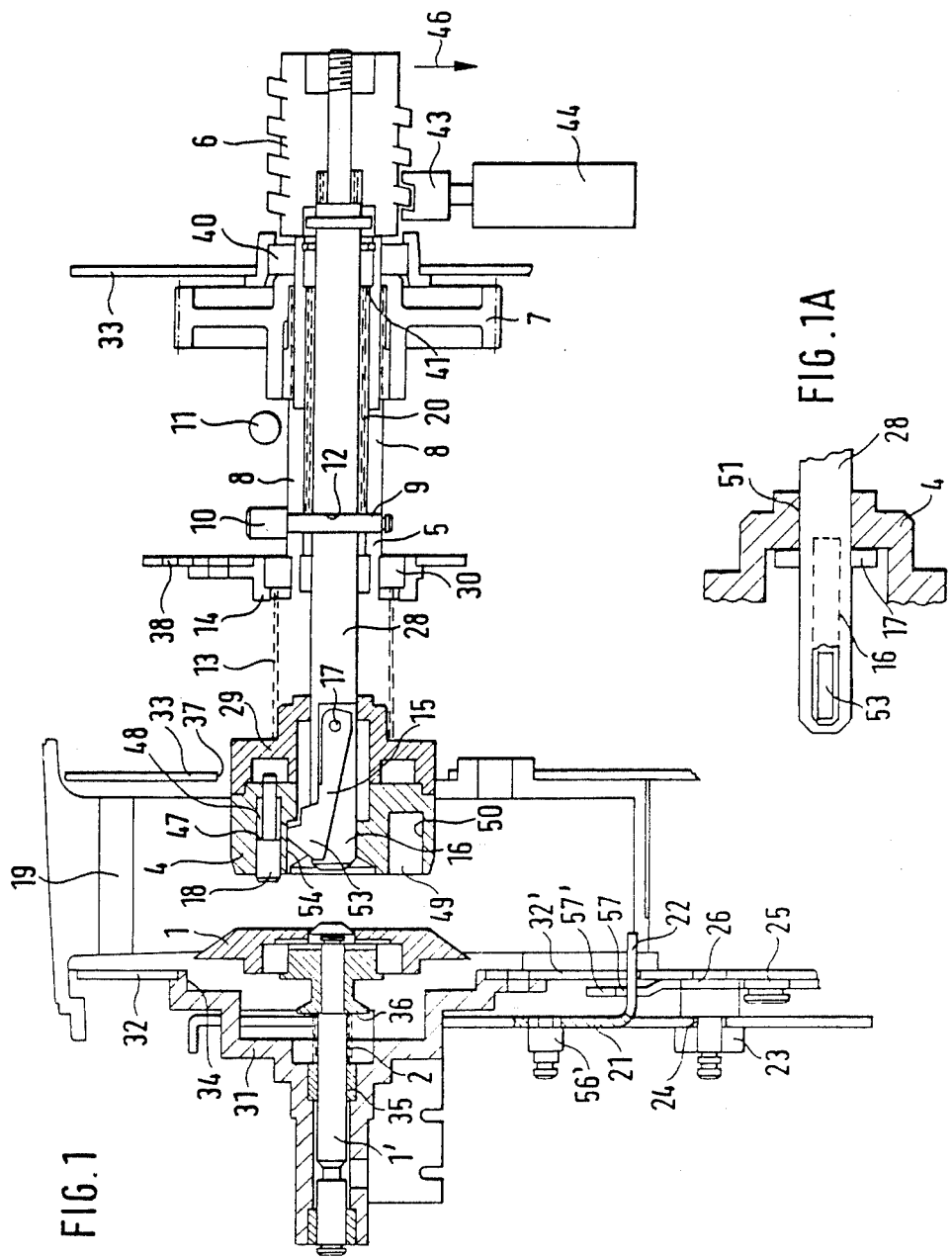

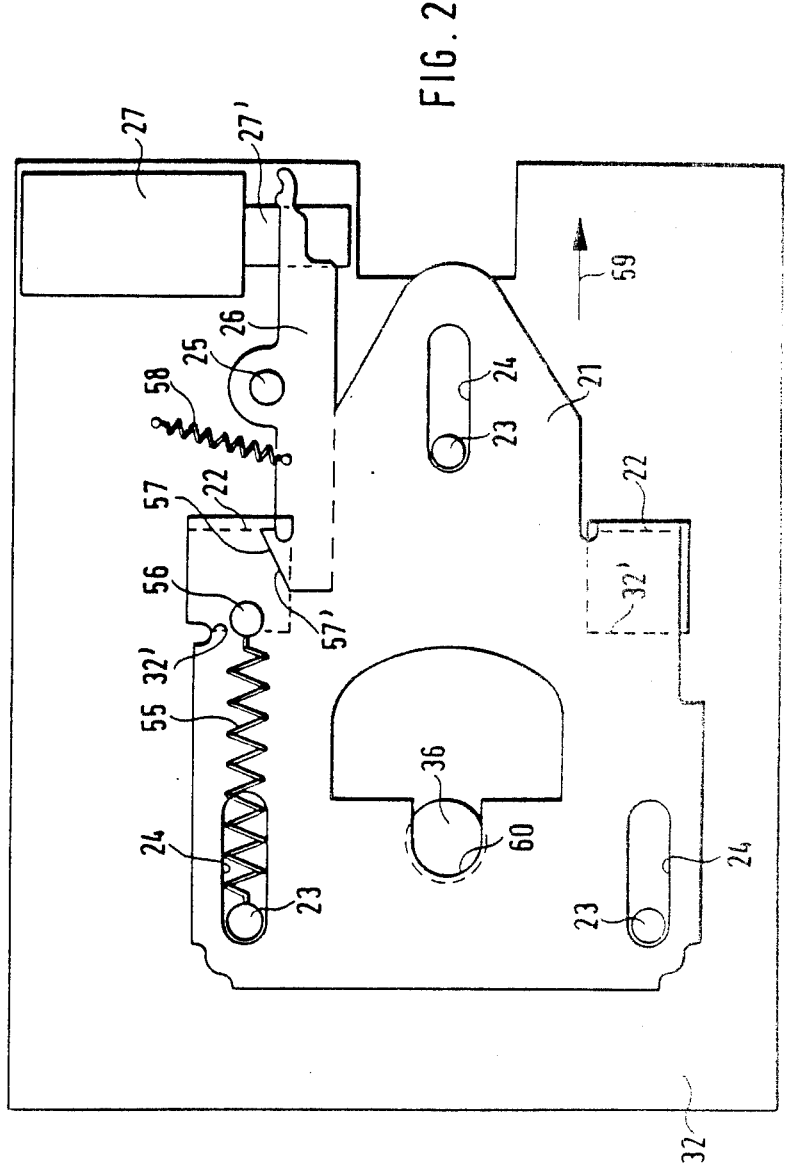

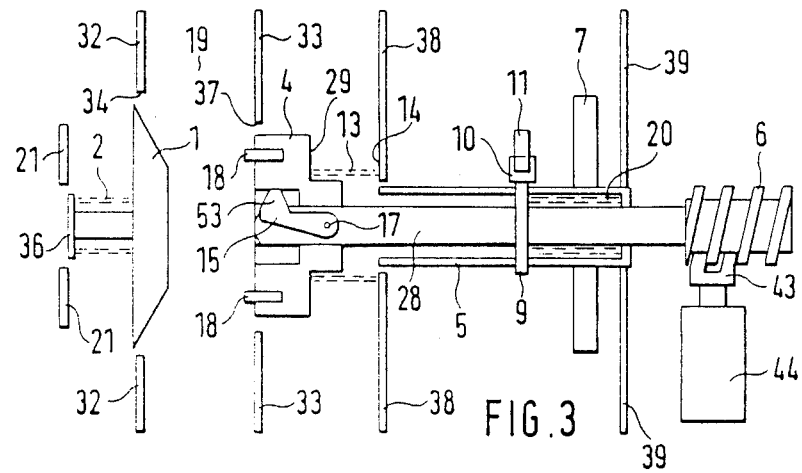
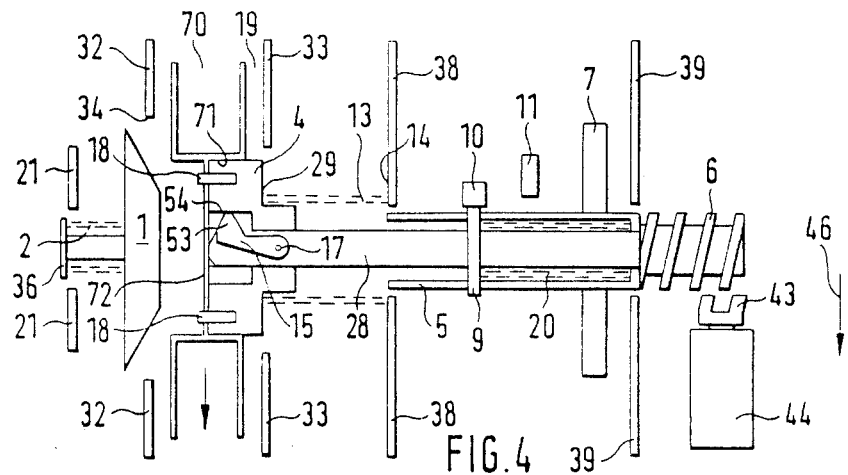
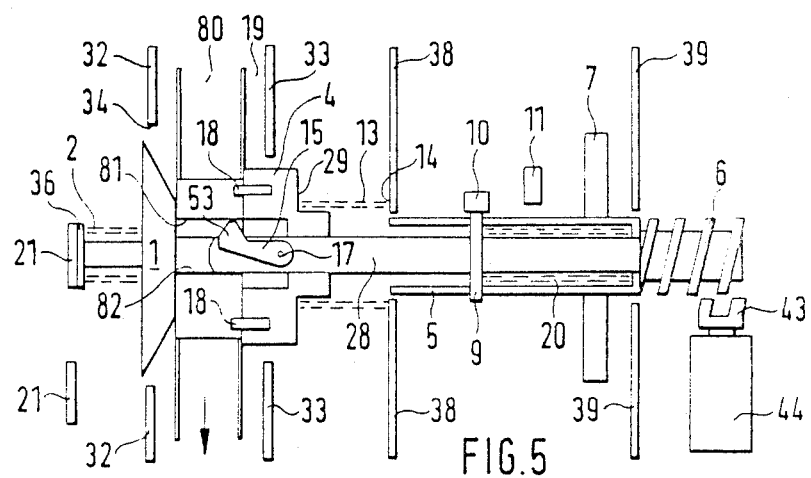

DRIVE ASSEMBLY FOR MICROFILM CARTRIDGES

BACKGROUND OF THE INVENTION

1. Field of the Invention

The invention relates to a drive assembly for cartridges, particularly microfilm cartridges, and in one aspect to an improved drive for microfilm reels in a cartridge which is received in a cartridge receiving channel of a microfilm apparatus.

2. Description of the Prior Art

Drive assemblies of this kind are disadvantageous in that each can be used for only one specific microfilm cartridge. As a result, microfilm apparatus equipped with drive assemblies of this type can be used with a specific type of microfilm cartridge only.

It is the object of the invention to provide a drive assembly for cartridges and particularly for the drive reels of microfilm cartridges having differently designed reel hubs.

SUMMARY OF THE INVENTION

A drive assembly for the reels of microfilm according to the present invention comprises a drive head movable toward and away from a back-support wheel. The drive head and back-support wheel are positioned on opposite sides of a cartridge receiving channel and are aligned with each other in a direction perpendicular to the direction of insertion of the cartridge. The drive head has entrainment means for coupling the head to a shaft for joint rotation and for releasing the head from such joint rotation. The drive head and a main shaft driven by drive means and of which the end portion concentrically engages the drive head affords a first predetermined type of drive and upon disengagement of the drive head from the main shaft a drive of a second predetermined type is provided. The drive head is resiliently biased by a first energy storage means towards the cartridge receiving channel and the main shaft is resiliently biased by a second energy storage means toward the cartridge receiving channel. The drive head has entrainment pins projecting from its end face and is adapted to engage corresponding openings in the core of a cartridge reel of the first type when the drive head engages a receiving opening in the reel core of the cartridge of the first type. The main shaft has in one end portion an entrainment element to engage a slit in a side wall of a receiving opening provided in the reel of a cartridge of the second type as the end portion of the main shaft enters a receiving opening in the reel core of the second-type cartridge. The back-support wheel is secured against axial displacement from the cartridge receiving channel automatically by lock means actuated by the introduction of a cartridge of the second type so that, for providing back support, the wheel engages the opposing side of a cartridge of the second type which has been introduced in channel. Moving means are provided to axially withdraw main shaft and drive head from cartridge receiving channel against the force exerted by said second and first energy storage means respectively.

An essential advantage of the inventive drive assembly is that it is capable of driving microfilm cartridges which differ in construction. As a result, such different microfilm cartridges can now be used in one and the same microfilm apparatus. As a further consequence, microfilm apparatus equipped with the inventive drive assembly can now be used universally and advantageously in a cost-effective manner.

Advantageously, the inventive drive assembly can be used with 3M microfilm cartridges and with ANSI microfilm cartridges.

Additional essential advantages of the inventive drive assembly are that it operates reliable, is simple in construction and thus inexpensive in manufacture, and is adapted to be controlled in a simple manner by electronic logic means.

Additional advantageous embodiments of the invention are recited in the dependent claims.

BRIEF DESCRIPTION OF THE DRAWING

Embodiments of the invention will now be explained in detail under reference to the accompanying drawing wherein:

FIG. 1 is a sectional view taken longitudinally through the inventive drive assembly;

FIG. 1A is a detail sectional view of the device of FIG. 1;

FIG. 2 is a left side view of the drive assembly shown in FIG. 1; and

FIGS. 3 to 5 schematically show the operation of the inventive drive assembly.

DESCRIPTION OF THE PREFERRED EMBODIMENT

As shown in FIGS. 1 and 2, the drive assembly of the present invention includes a back-support wheel 1 mounted for axial displacement in a housing portion 31 of the microfilm apparatus and for rotation about axis 1'. Housing portion 31 is secured on a housing wall 32 which partly defines input channel 19 for receiving the microfilm cartridge on one side in a direction perpendicular to the plane of the drawing. Back-support wheel 1 extends yieldingly through an opening in housing wall 32 into receiving channel 19. Such yield is provided preferably by a helical spring 2 placed concentrically around shaft 1' of wheel 1, which is mounted for rotation in housing portion 31. Spring 2 has one end thereof placed against housing portion 31 or against a bearing provided therein for mounting shaft 1', and has its other end bearing against a shoulder 36 on wheel 1. As a consequence back-support wheel 1 is movable by the force exerted by spring 2 from housing portion 31 towards cartridge receiving channel 19. On its other side, cartridge-receiving channel 19 is defined by another housing wall 33 having an opening 37 to receive a drive head 4 located opposite back-support wheel 1. Drive head 4 is mounted on a main shaft 28; also, as will be explained in detail below, it is adapted to rotate either freely on main shaft 28 or together with it, depending on the position of an entrainment arm 15. A spring 13, which preferably is a helical spring concentrically placed around main shaft 28, is provided to urge drive head 4 towards back-support wheel 1. Spring 13 has one end thereof placed against a shoulder 29 on drive head 4, and its other end against a shoulder 14 formed, for example, on a bearing 30 in a housing wall 38 extending in parallel with housing walls 32, 33. Bearing 30 mounts one end of a sleeve 5 which concentrically surrounds main shaft 28 in an area distant from drive head 4. The other end of sleeve 5 is mounted for rotation in another bearing 40 in another housing wall 39 extending in parallel with housing wall 38. Sleeve 5 carries for rotation therewith a drive wheel 7 preferably disposed adjacent the housing wall 39 surface facing housing wall 38. Preferably, drive wheel 7 is rotated by means not shown through a toothed belt (also not shown). Main shaft 28 has therein a bore 12 extending along a diameter thereof, which bore preferably is provided between housing walls 38, 39 adjacent housing wall 38. This bore receives a transversely extending pin 9. The ends of pin 9 which project from main shaft 28 extend through elongated slots 8,8 extending in the longitudinal direction of sleeve 5 through the walls thereof on opposite sides of its axis. The space between main shaft 28 and sleeve 5 receives a helical spring 20 of which one end is placed against pin 9 and of which the other end is preferably placed against a bearing 41 in sleeve 5, or against a bearing ring 41 mounting main shaft 28 for axial displacement. The end of main shaft 28 extending through housing wall 39 has mounted thereon for joint rotation a worm gear 6 the threads of which may be engaged by a member 43 having a configuration complementary to the worm gear. Member 43 is adapted to be moved by solenoid 44 against the bias force exerted by a spring in the direction of arrow 46 so as not to engage worm gear 6.

In its end face opposite back-support wheel 1, drive head 4 has bores 47 uniformly spaced along a concentric circle to receive entrainment pins 18 in a manner such as to be urged from bores 47 towards back-support wheel 1 by the force of a spring 48. Each of such springs 48 concentrically surround the shank of an entrainment pin 18 with one end of spring placed against an end surface of bore 47 and the other end of spring 48 placed against a shoulder formed between the shank of entrainment pin 18 and the pin end projecting from bore 47. Preferably, two such entrainment pins 8 are provided in a diametrically opposite relationship in drive head 4; their functions will be explained in detail below.

On the side of drive head 4 opposite back-support wheel 1, preferably four permanent magnets 49 are provided and equally spaced along a concentric circle in corresponding bores 50 so as to terminate flush with the end face of drive head 4 opposite back-support wheel 1. In the manner evident from FIG. 1A, the end of main shaft 28 which extends into drive head 4 through a bore 51 has therein a slot 16 symmetrical relative to a diameter and extending along a pre-determined distance, there being mounted for rotation in said slot about an axis 17 the previously mentioned entrainment arm 15. The axis of rotation 17 is formed by a pin placed in opposite wall portions of slot 16. Entrainment arm 15, which is rotatable about pin 17 in slot 16, is biased radially outwardly by a spring (not shown) also placed in the slot, so that its portion 53 extends from slot 16 beyond the periphery of main shaft 28 to engage a slot 54 provided in the walls of the bore in drive head 4 which receives part of main shaft 28. As a result, drive head 4, which is seated on the periphery of main shaft 28 for free rotation thereon, is coupled to main shaft 28 for rotation therewith as a portion 53 of entrainment arm 15 engages slot 54. Preferably, pin 17 is extended at both ends beyond the periphery of main shaft 28 to form axial abutments for drive head 4, these abutments extending behind a portion of the bore of drive head 4 through which main shaft 28 extends into the interior of drive head 4.

On the side of housing wall 32 which is turned away from drive head 4 there is mounted—in the manner shown in detail in FIG. 2—a slide member 21 for movement between two positions. Slide member 21 is in plate shape and has elongated slots 24 therethrough to engage pins 23 mounted in housing wall 32. Slide member 21 also has tabs 22 to engage openings 32' in housing wall 32, said tabs being positioned one above the other in the vertical direction of the cartridge receiving channel and projecting into openings 32'. Conveniently, the two end positions of slide member 21 are determined by the edges of these openings. A microfilm cartridge being introduced into cartridge receiving channel 19 causes slide member 21 in FIG. 2 to be displaced to the right by the leading end of the cartridge introduced in channel 19 engaging tabs 22. Slide member 21 is displaced against the force exerted by a spring 55 attached to slide member 21 by means such as a pin 56 secured thereto, and to housing wall 32 by means such as a guide pin 23 extending through a slot 24. An elongated lock member 26 mounted for rotation about an axis 25 has at its one end on one side of the axis of rotation 25 a locking nose 57 to engage the rear surface of a tab 22 at the time a microfilm cartridge has been introduced completely in channel 19, with a spring 58 being provided (for simplicity, this spring is shown but schematically in FIG. 2) to bias lock member 26 about pivot 25 to pull its locking nose 57 into a position of engagement with the associated tab 22. To enable locking nose 57 to pivot against the bias exerted by spring 58 in response to displacement of slide member 21, locking nose 57 is provided with a camming edge portion 57' to engage the edge of tab 22 facing nose 57 as slide member 21 moves in the direction of arrow 59 to cause locking nose 57 to be removed from the area of tab 22 against the force of spring 58 until the tab has moved completely over nose 57. In this condition, locking nose 57 can be moved by spring 58 into a position of engagement behind tab 22 after the latter has been released, with lock member 26 rotating about pivot 25. Moving slide member 21 in the direction of arrow 59 causes the aforesaid spring 55 to be tensioned so that slide member 21 is moved against the direction of arrow 59 into its first position when locking nose 57 disengages tab 22. To obtain such disengagement, a member 27' is provided at the end of lock member 26 opposite nose 57, relative to pivot 25. That member 27' is adapted to be moved to move nose 57 from the area of tab 22 by energizing a solenoid 27. Solenoid 27 preferably is mounted on housing wall 32.

As will be explained in greater detail below, slide member 21 in its second position causes the aforementioned shoulder 36 on back-support wheel 1 to be engaged by edge portions of an opening 60 in slide member 21, whereby in that second position of slide member 21 it will not be possible any more for back-support wheel 1 to be urged against the force of the previously mentioned spring 2 from the area of cartridge receiving channel 19 in the direction of shaft 1' of back-support wheel 1.

Reference is made to FIGS. 3 and 5 now for a detailed explanation of the operation of the present drive assembly. Details in FIGS. 3 and 5 which were explained under reference to FIGS. 1 and 2 already have the same reference numbers. In accordance with the view shown in FIG. 1, FIGS. 3 and 5 show top plan views of the present drive assembly. In the initial position shown in FIG. 3, slide member 21 is in its first position in which it is pulled by spring 55 to the left (in FIG. 2) or upwardly (in FIG. 3), respectively, to release shoulder 36 on back-support wheel 1. As a result, back-support wheel 1, which projects into cartridge receiving channel 19, is free to be withdrawn from channel 19 against the force of spring 2, i.e. to the left in FIG. 3. In that initial position, drive head 4 is removed from the area of cartridge receiving channel 19 in the direction of main shaft 28 by the force of springs 13 and 20. As will be explained in greater detail below, this position of drive head 4 is obtained by solenoid 44 being energized to cause member 43 to engage worm gear 6 for the release of a microfilm cartridge, and by sleeve 5 being rotated by drive wheel 7. The latter rotation is transmitted by transverse pin 9 to main shaft 28 and, with stationary member 43 engaging worm gear 6, causes main shaft 28 to be moved to the right against the force exerted by spring 20, with pin 9 moved along slots 8. This process proceeds until head 10 of transverse pin 9 abuts stationary stop 11. In that position, drive head 4 is withdrawn completely from cartridge receiving channel 19.

Referring to FIG. 4, there will now be explained the cooperation of the present drive assembly and a 3M microfilm cartridge 70. Initially, the construction of this cartridge will be explained. The reel core of such a cartridge 70 has an opening 71 therein. Drive head 4 is dimensioned to snugly fit into that opening 71. Opening 71 is defined axially by a metal wall 72 parallel with the end face of drive head 4 as cartridge 70 is introduced in cartridge receiving channel 19. Metal wall 72 is located substantially centrally relative to the longitudinal dimension of opening 71. Introduction of cartridge 70 in cartridge receiving channel 19 causes the housing of cartridge 70 to urge back-support wheel 1 against the force of spring 2 from cartridge receiving channel 19. As the leading end of cartridge 70—introduced in the direction of the arrow shown in the drawing—contacts tabs 22 of slide member 21, slide member 21 will move along with cartridge 70 until it has been moved against the force of spring 55 into its second position in which locking nose 57 engages the associated tab 22 in the manner described above. Preferably, that second position is reached when tabs 22 engage the corresponding edge portions of openings 32'. In that position, opening 71 is aligned with drive head 4, and energizing solenoid 44 will cause member 43 to be withdrawn from worm gear 8 in the direction of arrow 46 so that the bias exerted by spring 20 acting against transverse pin 9 movable in slots 8 will cause main shaft 28 to be shifted to the left. In the process, the force of spring 13 also shifts drive head 4 to the left to be introduced into opening 71 in cartridge reel 70. End portion 53 of outwardly biased entrainment arm 15 engages the aforesaid slot 54 in drive head 4 at a time not later than one full revolution of main shaft 28 relative to drive head 4 (or 180° of rotation in case two opposite slots are provided); thereafter drive head 4 will follow the rotation of main shaft 28, which is driven from drive wheel 7 through sleeve 5 and transverse pin 9. Outwardly resilient entrainment pins 18 will engage corresponding openings in metal disc 72 of cartridge 70. Also, the force of permanent magnets 49 in drive head 4 causes metal disc 72 of cartridge 70 to be held firmly against the end face of drive head 4.

Referring now to FIG. 5, it will now be explained how a ANSI cartridge 80 introduced in cartridge receiving channel 19 in the direction of the arrow shown in the drawing is driven by the present drive assembly. An ANSI cartridge does not have any opening comparable with opening 71, and is thinner than the 3M cartridge 70. Rather, that cartridge has at the center a square opening of which the dimension between opposite sides is equal to the diameter of main shaft 28 (8 mm). A radially outwardly directed slit 81 is provided along one side of square opening 82. The thickness of cartridge 80 corresponds substantially to the distance between the end face of back-support wheel 1 and housing wall 33. In response to introduction of cartridge 80 into cartridge receiving channel 19, back-support wheel 1 will not be cammed from the channel 19 against the force of spring 2. As the leading end of cartridge 80 engages lugs 22, it moves slide member 21 into its second position in the manner explained under reference to FIG. 4. In that second position slide member 21 engages shoulder 36 of back-support wheel 1 so that it cannot be moved from the cartridge receiving channel 19 against the force of spring 2. As a result, back-support wheel 1 firmly engages the adjacent surface of cartridge 80. In contrast, introduction of a thicker 3M cartridge 70, as shown in FIG. 1, causes back-support wheel 1 to be urged from cartridge receiving channel 19 to cause shoulder 36—seen from channel 19—to be located behind the plane of slide member 21. Release of worm gear 6 by energizing solenoid 43 causes main shaft 28 to be moved in the previously mentioned manner to the left towards cartridge 80, with the end of main shaft 28 adjacent cartridge 80 entering square opening 82. The end face of drive head 4 is urged by spring 13 against the adjacent surface of cartridge 80. At this time, the main shaft 28 and cassette 80 move relatively to each other until portion 53 of entrainment arm 15, which is urged outwardly by spring bias, engages slit 81 in square opening 82. In this condition, cartridge 80 will follow the rotation of main shaft 28 which is transmitted from drive wheel 7 through sleeve 5 and transverse pin 9 to main shaft 28.

Rotation of drive wheel 7 in a counterclockwise direction (seen from the left), will cause the microfilm to be rewound into microfilm cartridge 70 or 80. A sensor provided in the microfilm apparatus, which may be a lighter barrier comprising for example an illuminated phototransistor (not shown) signals when the microfilm has returned completely to cartridge 70 or 80. The detection signal from the sensor is used to deenergize solenoid 44, so that member 43 engages worm gear 6 to withdraw main shaft 28 from cartridge receiving channel 19 upon continued rotation. This process causes spring 20 to be placed under compression because transverse pin 9 will slide to the right in elongated slots 8 until it engages stop 11. This amounts to the initial position (FIG. 3) in which cartridge 70, 80 may be removed from the cartridge receiving channel 19, conveniently after solenoid 27 has been energized and slide member 21 has been returned to its first position. Preferably, solenoid 44 is mounted on housing wall 39.

I claim:

1. In combination, a drive assembly for cartridges, particularly for microfilm cartridges adapted to be introduced into a microfilm cartridge receiving channel of a microfilm apparatus, said drive assembly comprising a drive head and a back-support wheel positioned on opposite sides of the cartridge receiving channel and aligned with each other in a direction perpendicular to the direction of introduction of the cartridge into the cartridge receiving channel, entrainment means for coupling for joint rotation and for releasing from such joint rotation said drive head and a main shaft driven by drive means, said main shaft has an end portion concentrically engaging said drive head, said entrainment means and drive head being engaged to drive a cartridge of a first predetermined type, and releasing of said entrainment means being adapted to automatically disengage said drive head from said main shaft for driving a cartridge of a second predetermined type, said drive head being resiliently biased by first energy storage means towards said cartridge receiving channel, said main shaft being resiliently biased by second energy storage means toward said cartridge receiving channel, said drive head having entrainment pins projecting from its end face and adapted to engage corresponding openings in a reel core of a cartridge of the first type when said drive head engages a receiving opening in the reel core of a cartridge of the first type, said main shaft having in one end portion said entrainment means for engaging a slit terminating in a side wall of a receiving opening provided in a reel core of a cartridge of said second type as said end portion of said main shaft enters said receiving opening in the reel core of the second-type cartridge, said back-support wheel being secured automatically by lock means against axial displacement from the cartridge receiving channel by the introduction of a cartridge of the second type so that said back support wheel engages the opposing side of a cartridge of the second type which has been introduced in said channel, said drive assembly further comprising moving means provided to axially withdraw said main shaft and drive head from said cartridge receiving channel against the force exerted by said second and first energy storage means, respectively.

2. The combination according to claim 1, wherein said first energy storage means comprising a helical spring placed around said main shaft, one end of said helical spring resting on a shoulder provided on the rear surface of said drive head, the other end of said helical spring resting on a stationary portion of the microfilm apparatus, and said helical spring resiliently urging said drive head against abutment means provided on said main shaft for limiting relative axial movement.

3. The combination according to claim 2, wherein said stationary portion is a housing wall through which said main shaft extends.

4. The combination according to claim 1, wherein a sleeve having ends surrounds a portion of said main shaft concentrically at an area spaced from said drive head, the ends of said sleeve being supported for rotation in spaced housing walls, a drive wheel coupled for rotation with said sleeve and connected to said drive means to impart rotary movement to said sleeve, said sleeve having therein two opposite elongated slots extending axially, a pin provided to extend transversely through a throughbore in said main shaft and through said slots in said sleeve, and said second energy storage means being provided in the space between said sleeve and said main shaft in the form of a helical spring, one end of said spring rests on said transverse pin and the other end of said spring rests on a bearing ring provided between the inner wall of said sleeve and the periphery of said main shaft.

5. The combination according to claim 4, wherein said transverse pin has a head projecting from the periphery of said sleeve which is rotated against a stationary abutment pin as said main shaft and said drive head approach the position thereof for withdrawal of said drive head from said cartridge receiving channel.

6. The combination according to claim 1, wherein said moving means comprises a worm gear on the end of said main shaft distal from said drive head for rotation with and extending axially with respect to said main shaft, the threads of said worm gear being adapted to selectively engage a stationary member adapted to be actuated by a solenoid so as to cause withdrawal of said main shaft and said drive head from said cartridge receiving channel upon rotation of said main shaft.

7. The combination according to claim 6, wherein said entrainment means comprises an entrainment lever mounted for rotation about a pin inside a central slot provided in a portion of said main shaft which position is located inside said drive head, a pin engaging said main shaft on opposite sides of the slot and said entrainment lever being spring biased in a manner such that its free end projects resiliently from said slot beyond the periphery of said main shaft, said drive head having an inner wall receiving said main shaft and said inner wall having a slit which receives said free end of said entrainment lever.

8. The combination according to claim 7, wherein said pin is extended at both ends beyond the periphery of said main shaft to engage a shoulder on said drive head and limit movement of said drive head under the bias of said first energy storage means.

9. The combination according to claim 7, wherein said free end of said entrainment lever is adapted to engage a slit terminating in the reel core opening of a cartridge of said second type which has been introduced in said cartridge receiving channel, said reel core opening receiving the end portion of said main shaft which extends axially beyond said drive head engaging said second-type cartridge after said stationary member has released said worm gear.

10. The combination according to claim 1, wherein an end face of said drive head has a number of bores each having therein a permanent magnet with one end of each of said magnets terminating flush with said end face of said drive head, and said permanent magnet attracting a sheet of metal provided on a reel core of said cartridge of said first type which has been placed in said cartridge receiving channel, such metal sheet being provided in an opening a reel core of said first-type cartridge which said drive head enters under the force of said first and second energy storage means.

11. The combination according to claim 10, wherein said permanent magnets are distributed uniformly across the end face along a circle concentric with said main shaft 12. The combination according to claim 1, wherein said drive head has two entrainment pins provided on opposite sides of the axis of said drive head.

13. The combination according to claim 1, wherein said lock means comprises a slide member mounted for sliding displacement in said direction of cartridge introduction to said cartridge receiving channel on a housing wall, said slide member having tabs extending into said cartridge receiving channel and engageable upon introduction of a cartridge of said first or second type, respectively, causing the leading edge of the cartridge which first enters the channel to engage said tabs to move said slide member against the force of a third energy storage means from a first to a second position, tabs engaging an abutment edge portion of an opening in said housing wall in the second position in which a cartridge introduced in said cartridge receiving channel is aligned with said drive head and back-support wheel, a locking member actuated to lock said tabs in the second position, a solenoid for releasing said locking member, and said slide member having therein an opening of which a marginal portion, as seen from said cartridge receiving channel, moves behind and engages a shoulder on said back-support wheel in the second position of said slide member so that when a comparatively thinner cartridge of said second type is introduced, displacement of said back-support wheel from the cartridge receiving channel is prevented and, when a comparatively thicker cartridge of said first type is introduced into said cartridge receiving channel, said shoulder being displaced from said channel behind the plane of said slide member before said second position is reached so that said marginal portion of said opening cannot block said shoulder on said back-support wheel, whereby said back-support wheel moved from said cartridge receiving channel by said first-type cartridge against the force exerted by said first energy storage means.

14. The combination according to claim 13, wherein said locking member comprising an arm mounted for rotation about a pivot and of which one end on one side of said pivot has a locking nose whereas the other end on the other side of said pivot is actuatable by said solenoid in a manner such that said locking nose, which in the second position is made to engage and lock by fourth energy storage means one of said tabs, releases said one tab so that slide member is returned by the force of said third energy storage means to the first position in which said tabs engage abutment edges of said openings opposite said one abutment edge and in which the marginal portion of said opening is outside the reach of said shoulder.

15. The combination according to claim 14, wherein said assembly includes sending means to generate a signal when said slide member reaches its said second position so as to cause a worm gear on the end of said main shaft opposite said entrainment means to be released and to generate a second signal after the microfilm has been returned into a cartridge of said first or second type, respectively, for actuating a second solenoid so that a stationary member engages the worm gear, whereby said main shaft and said drive head may be withdrawn from said cartridge receiving channel.

* * * * *

UNITED STATES PATENT AND TRADEMARK OFFICE
CERTIFICATE OF CORRECTION

PATENT NO. : 4,732,342

DATED : March 22, 1988

INVENTOR(S) : Heinz G. Mobius

It is certified that error appears in the above-identified patent and that said Letters Patent is hereby corrected as shown below:

Column 9, line 12, after "wheel" insert --may be--.

Signed and Sealed this

Twenty-second Day of November, 1988

Attest:

DONALD J. QUIGG

*Attesting Officer*   *Commissioner of Patents and Trademarks*